United States Patent [19]

Hollo

[11] 4,312,435
[45] Jan. 26, 1982

[54] SAFETY DEVICES FOR MECHANICALLY OPERATED APPARATUS SUCH AS A PUNCH PRESS

[75] Inventor: Leslie J. Hollo, Ancaster, Canada

[73] Assignee: The Brown Boggs Foundry and Machine Company Limited, Hamilton, Canada

[21] Appl. No.: 82,564

[22] Filed: Oct. 9, 1979

Related U.S. Application Data

[63] Continuation-in-part of Ser. No. 908,442, May 22, 1978, abandoned.

[51] Int. Cl.³ .................... F16P 3/00; F16D 71/00
[52] U.S. Cl. ........................ 192/149; 100/53; 192/28
[58] Field of Search ............ 192/148, 149, 28, 26; 100/53; 188/321

[56] References Cited

U.S. PATENT DOCUMENTS

| | | | |
|---|---|---|---|
| 762,802 | 6/1904 | Casgrain | 192/149 |
| 1,173,423 | 2/1916 | Hagelstein | 192/149 |
| 1,343,580 | 6/1920 | Parkinson | 192/149 |
| 1,865,814 | 7/1932 | Berry | 192/129 R |
| 2,646,152 | 7/1953 | Retz | 192/149 |
| 2,743,802 | 5/1956 | Hart | 192/26 X |
| 2,827,143 | 3/1958 | Meyercordt | 100/53 X |
| 2,860,525 | 11/1958 | Breadner | 100/53 X |
| 3,204,739 | 9/1965 | Moore | 192/149 X |
| 4,129,071 | 12/1978 | Oishi | 192/149 X |

FOREIGN PATENT DOCUMENTS 427413  4/1935  United Kingdom ............... 192/149

Primary Examiner—Rodney H. Bonck
Attorney, Agent, or Firm—Hirons, Rogers & Scott

[57] ABSTRACT

A safety device for mechanically-operated apparatus, such as a flywheel-driven punch press, consists of a hook-providing coupling member for mounting on the press crank shaft, and a cooperating coupling member for connection to the apparatus body via a power-absorbing member. The coupling members rest in the coupled position and are moved momentarily to the uncoupled position upon initiation of an operation by the operator. If therefore the movable member of the press continues to move after the normal termination of the cycle the coupled members connect the movable member to the power-absorbing member so that the movable member is brought to a stop before the press die parts can close. A third coupling member is provided for engagement with the second coupling member to brake the movement of the operating member if it should move in the opposite direction. The power-absorbing member preferably is a hydraulic piston and cylinder device connected between one coupling member and the press body, the liquid in the cylinder interior becoming pressurised and discharging via a preset relief valve or calibrated orifice when the device is operative.

21 Claims, 8 Drawing Figures

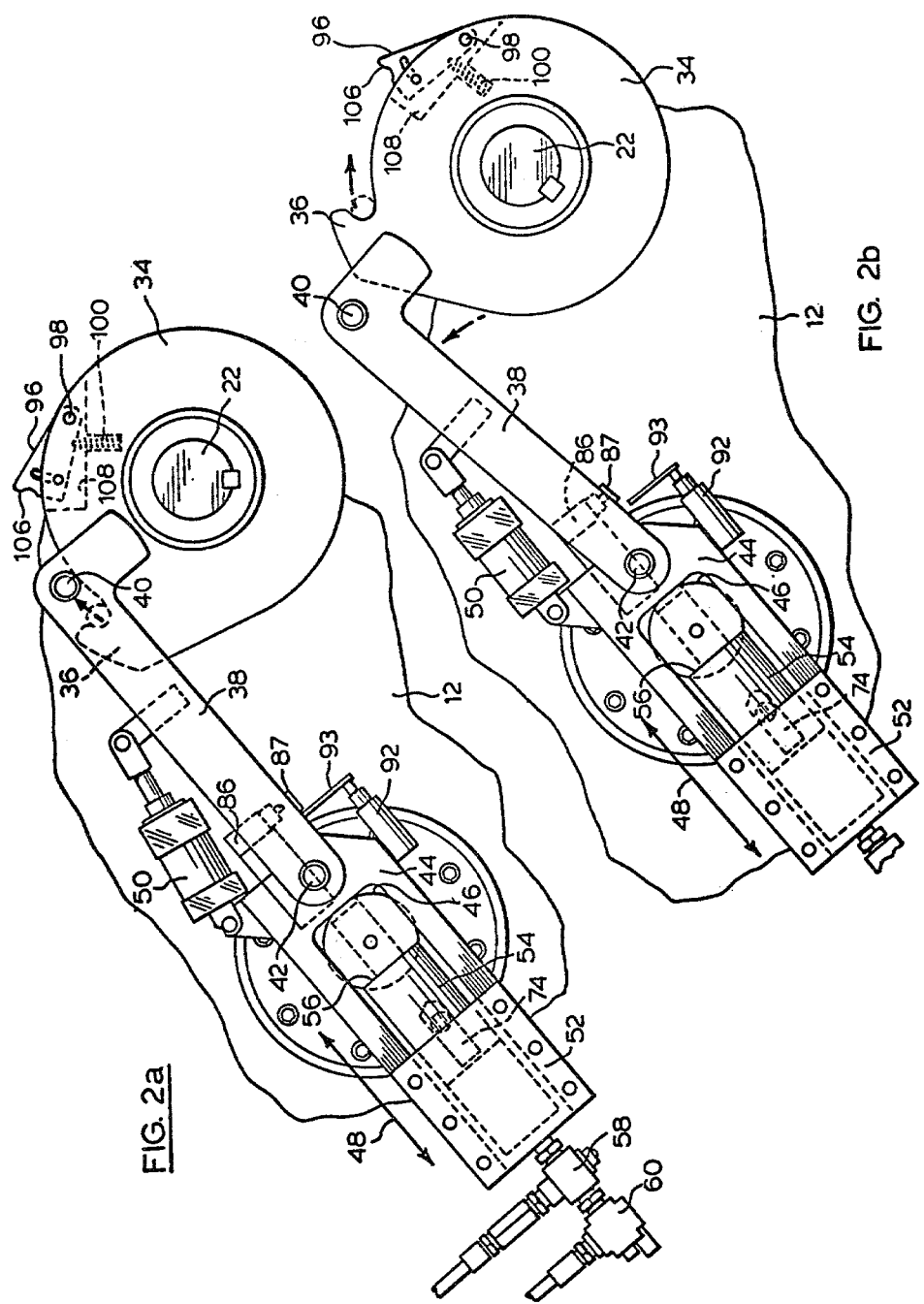

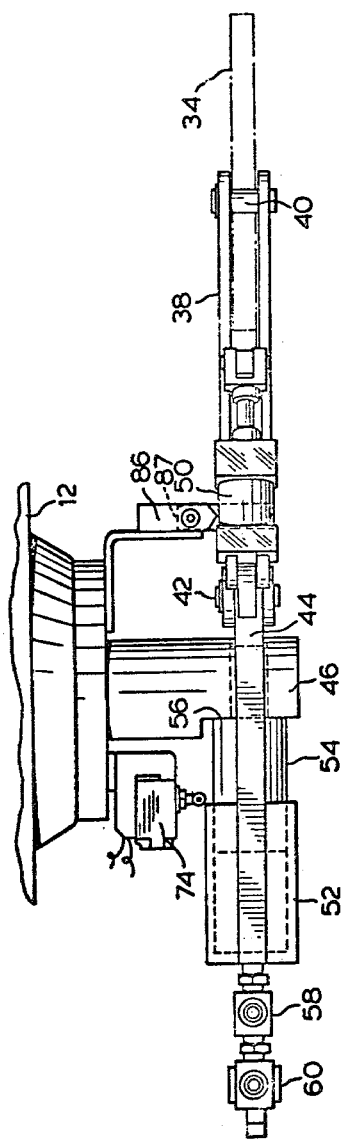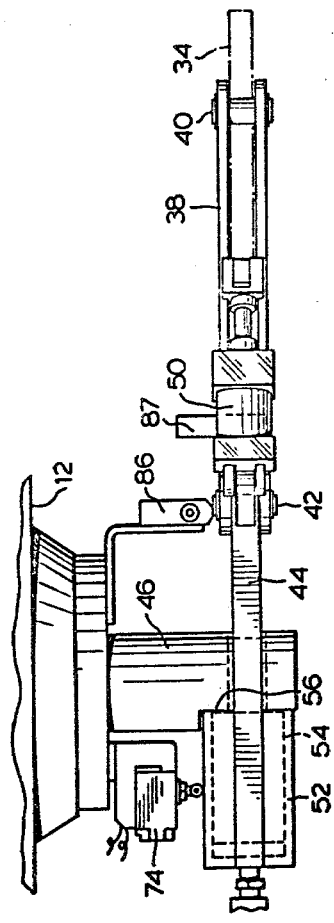

SAFETY DEVICES FOR MECHANICALLY OPERATED APPARATUS SUCH AS A PUNCH PRESS

CROSS-REFERENCE TO RELATED APPLICATION

The present application is a continuation-in-part of my earlier application Ser. No. 908,442, filed May 22, 1978, now abandoned.

FIELD OF THE INVENTION

The present invention is concerned with improvements in or relating to safety devices for mechanically-operated apparatus of the kind including a flywheel power-storage means such as a punch press.

REVIEW OF THE PRIOR ART

There have been numerous proposals hitherto for many different kinds of safety devices for manually-operated apparatus of the kind specified, such as presses and guillotines, all with the purpose of attempting to ensure the safety of the operator. For example, it is common to provide two spaced pushbuttons that must operate simultaneously to initiate operation of the apparatus, so that the operator's hands must be removed from the danger area for this purpose. Other proposals involve the use of guards which are interposed between the operator and the danger area while the apparatus is in operation.

Such apparatus almost invariably consists of a movable member driven from a power-storage drive means, such as a motor-driven flywheel, via a clutch and brake combination that is effective to clutch together the drive means and the movable member for operation of the latter, and to brake the movement of the member when the clutch is disengaged. A particularly dangerous malfunction can occur if the clutch should fail to disengage upon termination of a cycle of operation, perhaps due to wear or jamming of the clutch plates, or the brake should fail to engage, since the movable member will then continue its movement with maximum momentum, at a time when the operator is not expecting such movement, and may have placed a hand or hands into the path of the member.

As a result of the preliminary novelty search of the U.S. prior art in class 192 (Clutches and power-stop controls) sub-classes 129 (safety-devices), 131 (hand protector, two hand) and 134 (punch-press type) and in class 100 (Presses), sub-class 53 (interrelated or safety controls) the following U.S. patent specifications were reviewed:

U.S. Pat. Nos. 1,828,723; 1,865,814; 1,934,984; 1,939,006; 1,957,835; 2,404,980; 2,473,219; 2,767,818; 2,830,686; 3,095,804; 3,103,270; 3,147,836; 3,226,998; 3,791,496 and 4,037,699.

Of these noted specifications the most pertinent is believed to be U.S. Pat. No. 1,865,814 to Berry which discloses a starting and stopping device for a machine, specifically a paper guillotine, including several automatic devices for stopping the machine in case one of them should fail. The machine is driven from a motor via gearing without the use of a power-storage device, and is started by moving a handle 66 to the right as seen in FIG. 4, which engages a friction clutch 43,44; this movement also moves a bar 90 having a shoulder 94 at its end which can engage a tooth 93 on a ring 92 rotatable with drive shaft 8; if a locking pin 70 (FIG. 9) on the handle 66 fails to cooperate with a wing 68 on the return stroke of the guillotine then the tooth 93 and shoulder 94 engage to disengage the clutch. The machine also includes a stop arm 104 (FIG. 4) on drive shaft 37 and a bolt 105, which bolt is movable with the clutch engaging and disengaging linkage to intercept the stop arm while the clutch is disengaged, and to be moved out of its path when the clutch is engaged, so that the knife will be positively stopped in its travel by engagement of arm 104 and bolt 105 when the clutch linkage is moved to the disengaged position.

U.S. Pat. No. 4,129,071 issued Dec. 12, 1978 to Alda Engineering Ltd. discloses an anti-overrun device for the slide in a press comprising a rotary member secured to a crankshaft and having a lateral projecting extending from the side of the rotary member, a cylinder secured to the framework of the press and receiving a piston for slidable movement therein, a damper pin supported by the piston for movement toward and away from the projection on the rotary member, an oil pressure chamber defined between one wall of the cylinder and the inner end of the piston to produce an oil pressure as the piston slidably moves within the cylinder. The damper pin is moved by air pressure between a retracted position and an extended position, the movement to the retracted position accompanying a cycle of the press and being held until the projection has passed. If the damper pin is not retracted because a cycle has not been commanded the damper pin and projection will engage to stop the press.

It is an object of the present invention to provide a new safety device for mechanically-operated apparatus that will positively stop motion of the moving parts of the press and thus protect the operator thereof.

It is a more specific object to provide a new safety device for mechanically-operated apparatus that is effective by absorbing the power of the moving parts of the apparatus upon malfunction that may endanger the operator.

In accordance with the present invention there is provided a safety device for use in combination with mechanically-operated apparatus such as a punch press or the like, the apparatus comprising:

(a) a body;

(b) an operating member movably mounted on the body to perform a work operation;

(c) a power-driven rotatable flywheel mounted by the body and for driving the movable member in such a work operation;

(d) a clutch connecting the flywheel and the movable member for the flywheel to drive the movable member upon actuation of the clutch; and (e) means for initiating such an actuation of the clutch the safety device comprising:

(f) a first coupling member adapted for connection with the flywheel to be movable therewith;

(g) a second coupling member normally positionable in a coupling position for coupling engagement with the said first coupling member;

(h) means for moving one of the coupling members to an uncoupling position upon said initiation of clutch actuation, the thus-moved coupling member returning to the said coupling position before completion of a work operation by the movable member, (i) a power-absorbing braking member for connection to the second coupling member and adapted to brake the movement of the operating member upon failure of the coupling members to uncouple, and (j) a third coupling member positioned for coupling engagement with the said second coupling member to brake the movement of the operating member upon reverse movement of the operating member.

Preferably the said first coupling member is a radially-extending hook member adapted to be mounted on a shaft for rotation therewith, and said second coupling member includes an arm pivoted to the said power-absorbing member for movement between the said coupled and uncoupled positions.

The said power-absorbing braking member may comprise a hydraulic piston and cylinder to one of which the said arm is pivoted, and a relief valve connected to the cylinder interior and adapted to relieve the liquid contents of the cylinder upon pressurisation thereof with operation of the device.

DESCRIPTION OF THE DRAWINGS

A safety device for a punch press, which device is a particular preferred embodiment of the invention, will now be described, by way of example, with reference to the accompanying diagrammatic drawings, showing the device installed on the punch press, wherein:

FIG. 2a is a side elevation of the safety device of FIG. 1, showing it in operative position ready to brake movement of the press operating member, FIG. 2b is a similar view to FIG. 2a showing the safety device in inoperative position upon initiation of an operation of the press, FIGS. 3a and 3b are plan views of the safety device corresponding respectively to FIGS. 2a and 2c.

DESCRIPTION OF THE PREFERRED EMBODIMENTS

Figure 1:
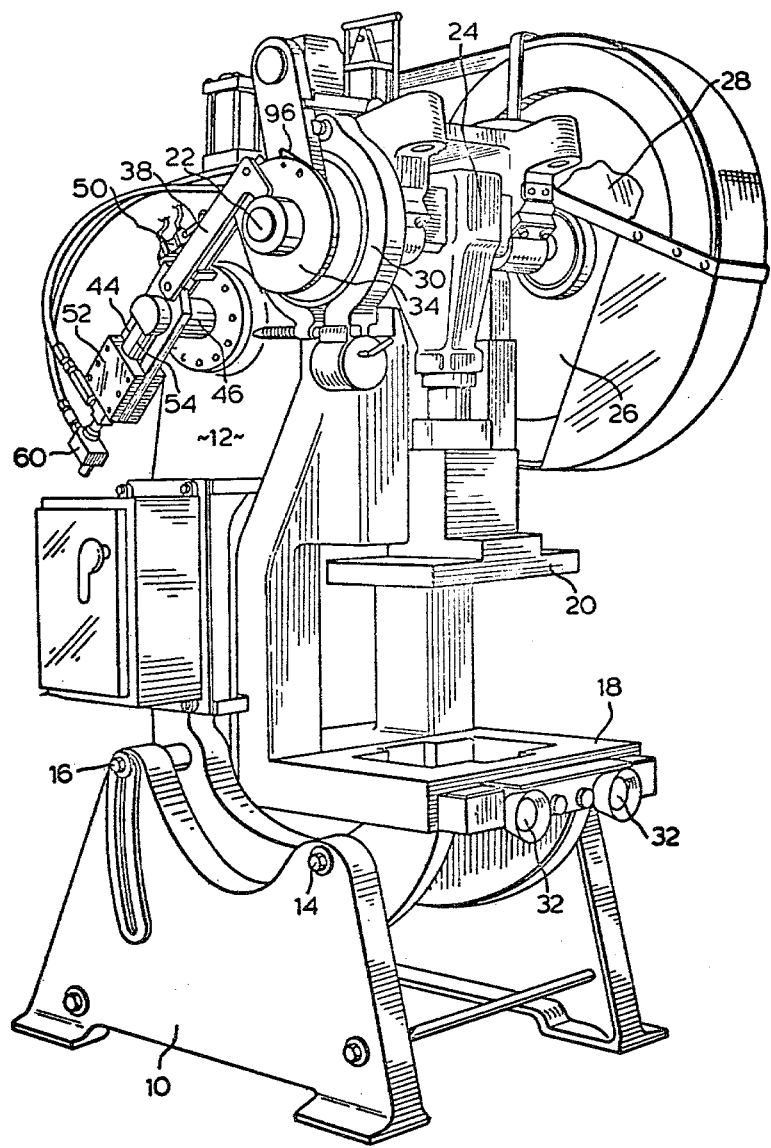
FIG. 1 is a general perspective view of the press with a safety device of the invention installed thereon.

The punch press shown in FIG. 1 is of a well-known type consisting of a massive base 10 to which a vertically-extending body 12 is pivoted at 14 and clamped at 16, so that the body can be tilted back when required, e.g. to facilitate removal of parts from the die. The body has a horizontal platen 18 to which the lower fixed die part is fastened, while the vertically-movable upper platen 20 for the other die part is connected to the crank shaft 22 by a pitman 24 mounted on shaft 22. In this press a power-storing means for driving the press include the shaft 22 and a flywheel 26 driven by any of the many known arrangements from an electric motor mounted on the press body. The shaft 22 is driven from the flywheel 26 via a controllable clutch 28 disposed behind the flywheel as seen in FIG. 1, this clutch being usually of the so-called "part-revolution" type, which may be engaged or released during any part of a cycle. In single-cycle mode it will stay engaged for one revolution and then automatically disengage, so that it must be re-engaged for each stroke of the press. The safety device of the invention may also be employed with the so-called "full" revolution type of clutch which, when once engaged, cannot be released until the end of each complete cycle. The clutch has associated therewith a brake 30 which is released as the clutch 28 is actuated, and is re-applied as the clutch disengages so as to brake the movement of the platen 20. In the embodiment illustrated the clutch is of the air-operated type engaged by application of air under pressure and is spring-released, and vice versa for the brake, although for example an electrically operated clutch and/or brake could be employed instead.

Operation of the press is initiated by the operator pushing two spaced pushbuttons 32 simultaneously. The safety device is operative as will be described below if for any reason the clutch should fail to disengage, for example, if the clutch plates should jam or bind in their engaged position, perhaps because of wear or the presence of a solid foreign body between them, and/or the brake should fail to engage because of some corresponding failure.

Turning now also to FIGS. 2 and 3, the safety device includes a first coupling member consisting in this embodiment of a disc 34 mounted on the shaft 22 and rotatable therewith about its longitudinal axis, the disc having a radially-outwardly-extending hook portion 36. A second coupling member cooperating with the first member in this embodiment consists of two spaced parallel L-shaped arms 38 that embrace the disc on either side thereof and carry between them a coupling pin 40 for engagement with the hook portion 36. The two arms are pivoted at 42 to a frame 44 mounted on and embracing a stop bar 46 rigidly fastened to the body and extending parallel to the shaft 22, the frame being movable on this bar in the direction of the arrows 48.

Figure 2C:
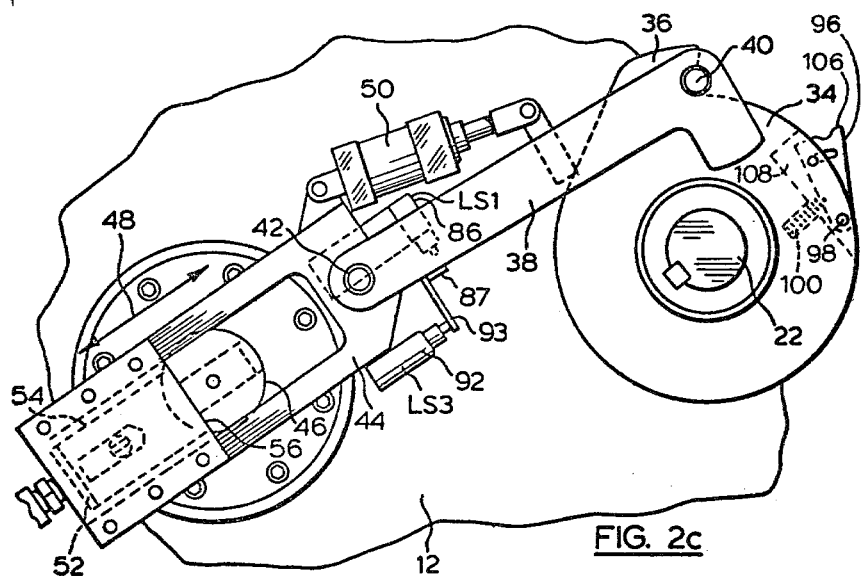
FIG. 2c is a similar view to FIG. 2a showing the safety device having operated successfully and braked the press operating member.
Figure 4:
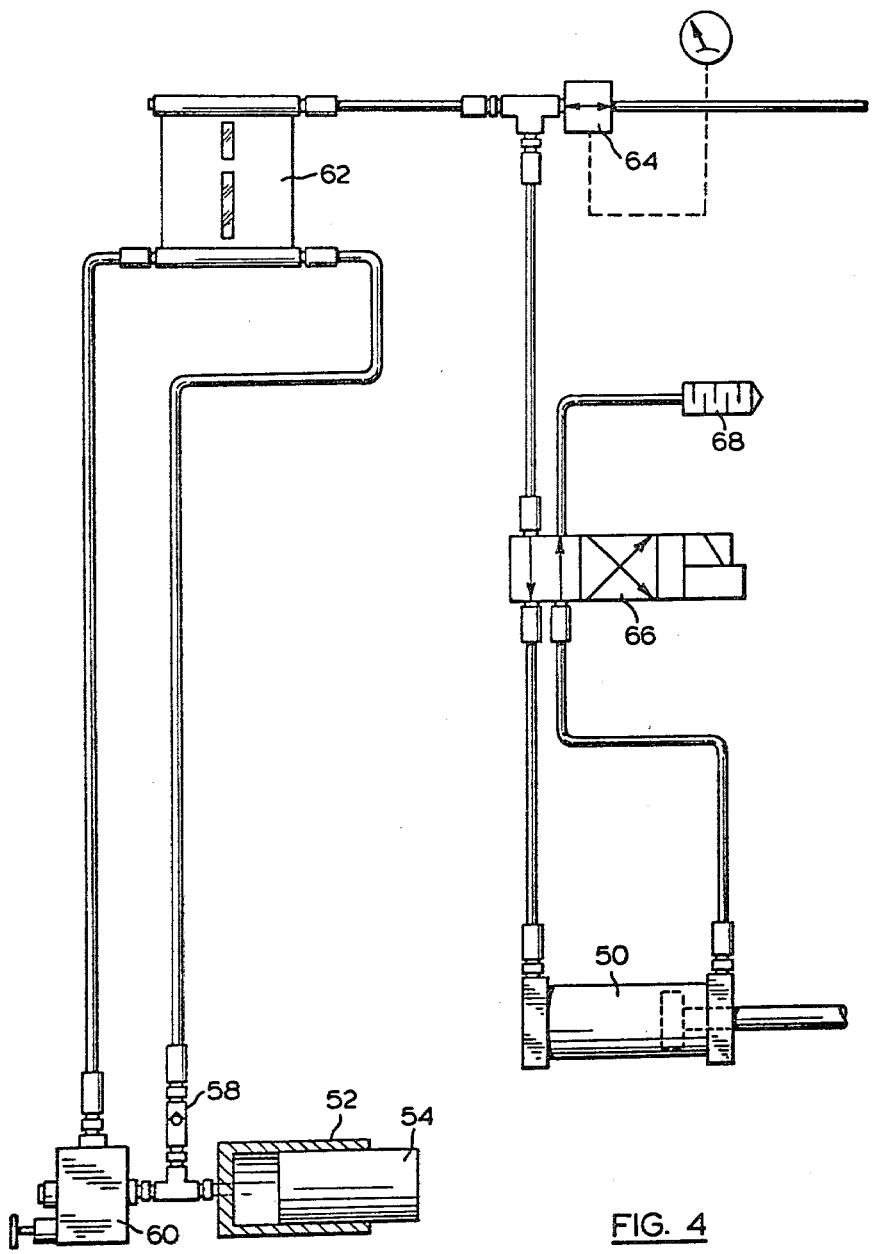
FIG. 4 is a schematic diagram of the part of the press hydraulic and pneumatic circuits pertinent to this invention.

The coupling member arms 38 move by the positive action of a double-acting air motor 50 to a coupling position shown in FIGS. 2a and 2c, in which the pin 40 must engage the hook portion 36 as the disc 34 rotates, and are moved to a non-coupling position shown in FIG. 2b by the operation of the motor 50, which is connected between the arms and the frame 44. The end of the frame further from the pivot 42 is formed as a hydraulic cylinder 52 in which is mounted a piston 54 that engages a flat axially-extending surface 56 on the stop bar 46. The interior of the cylinder 52 is connected via a one-way valve 58 to a relief valve 60, the setting of which is controllable by the operator. Alternatively the valves 58 and 60 may be replaced by a calibrated orifice. A suitable operating fluid, such as an oil, is fed to the cylinder 52 from an air/oil tank 62 (FIG. 4), to which oil discharged from the valve 60 is returned. The interior of the tank 62 is pressurised by supply of air thereto through a regulator 64. The pressurised air from the regulator 64 is also fed via a solenoid-operated four-way valve 66 to the cylinder of pneumatic motor 50, the air that escapes from the valve passing to atmosphere through a silencer 68.

Figure 5:
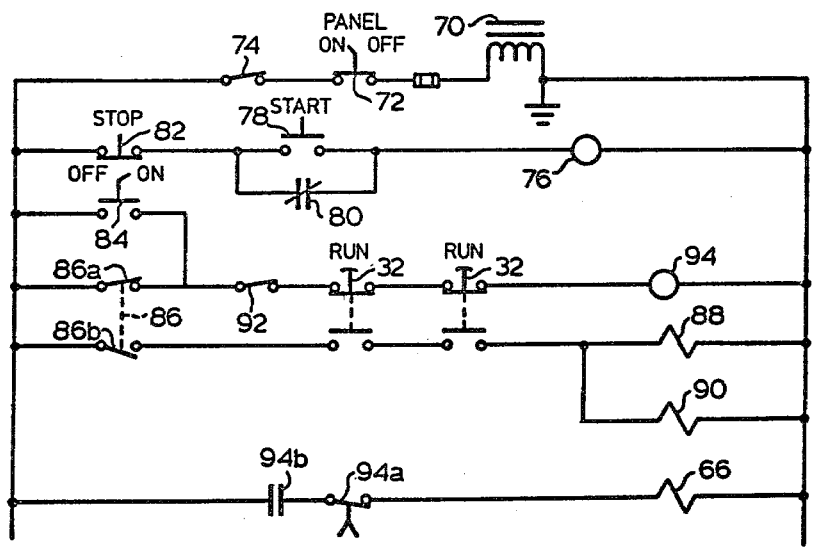
FIG. 5 is a schematic diagram of the part of the press electric circuit pertinent to this invention.

Referring now also to FIG. 5, electric power is fed to the control circuit from a transformer 70 via panel on-off switch 72 and micro-switch 74 (FIGS. 3a and 3b), the latter being mounted on the frame 12 and engageable by the cylinder 52 if the safety device becomes operative, as illustrated by FIG. 3b. The drive motor 76 is started by closure of start switch 78 and held in operation by hold-in contacts 80 until stopped by opening of stop switch 82; in commercial practice the motor will usually be of three-phase type though a single phase arrangement is shown for simplicity of illustration. The safety device is not required for continuous nonattended operation of the press, and can at such times be disabled by closing a switch 84. A micro-switch 86 is mounted on the frame 12, and is operated by a member 87 on the arms 38 the switch having a pair of contacts 86a in series with respective contacts 32a of the pushbuttons 32, and another normally-open pair 86b which are in series with contacts 32b of the pushbuttons 32 and also with the windings of solenoid valves 88 and 90 controlling respectively the clutch 28 and the brake 30. Another micro-switch 92 mounted on the frame 44 is operated by a member 93 on the arms 38. The function of switches 86 and 92 will be described below.

The closing of the pushbuttons 32 will not produce operation of the press unless the arms 38 are in the position shown in FIG. 2a, when contacts 86a and 92 are closed; when contacts 86a are closed contacts 86b are open, and vice versa. A variable time delay relay 94 now operates closing its contacts 94b so that power is supplied to solenoid relay 66 to operate air motor 50. The arms now lift to the uncoupling position of FIG. 2b opening switch 92 and contacts 86a but closing contacts 86b, so that power is now supplied to solenoid valves 88 and 90 engaging the clutch and releasing the brake. The downwardly-extending portions of the L-shaped arms ensure that they will remain embracing the disc 34 in the uncoupled position. After a preset time delay contacts 94a of the relay open and solenoid 66 operates motor 50 to force the arms downward back to the engaging position, closing contacts 86a and switch 92, and opening contacts 86b. This predetermined period is such that the hook portion of disc 34 rotates beyond the position in which it can be engaged by the pin 40 when the arms return to their coupled position.

If the press is functioning normally the clutch will disengage and the brake will engage in time for the shaft 22 and disc 34 to come to rest in the position shown in FIG. 2a, ready for the next cycle of operation. If however the clutch fails to disengage and/or the brake is not operative then the disc will continue its rotation with hook portion 36 and pin 40 in coupled position, so that frame 44 is pulled to the right as seen in the Figures, forcing the piston 54 into the cylinder 52 against the reaction of the stop member 46. The action of the piston 54, cylinder 52 and stop valve 60 (or the above-mentioned calibrated orifice) is to provide a cushioned power-absorbing, safety braking of the downwardly-moving platen 20, the hydraulic system being rated to stop the downward movement before the die parts on the respective platens come close enough to one another to injure the operator whose hands may be in the die area. This corresponds to the position in which the piston 54 reaches the end of the cylinder 52, in which case the bar 46 would provide a final positive stop.

Preferably, the hydraulic system is rated to stop the crank shaft 22 in about 30° or less of its rotation. It will be appreciated that owing to the large amount of power stored in the flywheel this may rotate through considerably more than 30° by over-running the clutch and the brake, but this is immaterial as long as the downward movement of the platen is stopped in good time. The movement of the frame 44 to the FIG. 2c position opens switch 92 to stop the press entirely until the cause of the failure has been checked and the system reset.

It may be found that, if the safety device has been applied upon failure of the press brake, there may be enough energy stored in the safety device to cause the crankshaft to reverse its rotation and the platen to reverse its movement and move downwards sufficiently to injure the operator. This possibility is prevented by the provision of a third coupling member consisting of a reverse stop latch 96 which is pivoted to the disc 34 about an axis 98 and is urged radially outward by a compression spring 100, the radially outermost positon of the latch being determined by a pin 102 engaged in an arcuate slot 104. The nose 106 of the reverse stop latch faces in the opposite direction to that of the disc hook portion 36, and engagement of the latch nose 106 with the coupling pin 40 while the disc is rotating normally merely moves the latch radially inwards out of the path of the pin and against the action of the spring 100 into a recess 108 in the disc. However, any reverse rotation of the disc after engagement of the hook portion 36 and pin 40 is prevented by engagement of the latch nose 106 and pin 40. Other equivalent constructions can of course be employed.

A power-absorbing hydraulic system is in general commercial practice the most satisfactory, since it is compact and capable of immediate re-setting once the device has operated successfully, so that output can be maintained. An equivalent pneumatic system would require the use of a much larger cylinder 52 and piston 54, and also the use of high pressure air, owing to the much higher compressability of air. It is contemplated that the cylinder 52 and piston 54 could be replaced by a crushable power-absorbing element, as used for example in automobile steering columns; such an element must be replaced each time that the safety device is operative, but that is relatively infrequently, and such a structure is very much cheaper to manufacture than the above-described hydraulic system, so that it may be preferred in certain installations.

I claim:

1. A safety device for use in combination with mechanically-operated apparatus such as a punch press or the like, the apparatus comprising:
   (a) a body;
   (b) an operating member movably mounted on the body to perform a work operation;
   (c) a power-driven rotatable flywheel mounted by the body and for driving the movable member in such a work operation;
   (d) a clutch connecting the flywheel and the movable member for the flywheel to drive the movable member upon actuation of the clutch; and
   (e) means for initiating such an actuation of the clutch the safety device comprising:
   (f) a first coupling member adapted for connection with the flywheel to be movable therewith;
   (g) a second coupling member normally positionable in a coupling position for coupling engagement with the said first coupling member;
   (h) means for moving one of the coupling members to an uncoupling position upon said initiation of clutch actuation, the thus-moved coupling member returning to the said coupling position before completion of a work operation by the movable member,
   (i) a power-absorbing braking member for connection to the second coupling member and adapted to brake the movement of the operating member upon failure of the coupling members to uncouple, and
   (j) a third coupling member positioned for coupling engagement with the said second coupling member to brake the movement of the operating member upon reverse movement of the operating member.

2. A safety device as claimed in claim 1, wherein the said first coupling member is a radially-extending hook member adapted to be mounted on a shaft for rotation therewith, and said second coupling member includes an arm pivoted to the said power-absorbing member for movement between the said coupled and uncoupled positions.

3. A safety device as claimed in claim 2, wherein the said power-absorbing braking member comprises a hydraulic piston and cylinder to one of which the said arm is pivoted, and a relief valve connected to the cylinder interior and adapted to relieve the liquid contents of the cylinder upon operation of the device.

4. A safety device as claimed in claim 3, wherein the said hydraulic piston and cylinder are engaged with a stop member adapted to be fastened to the apparatus body, the hydraulic piston and cylinder being connected between the arm and the stop member, and the stop member providing a positive stop for operation of the safety device upon maximum power absorption by the power-absorbing member.

5. A safety device as claimed in claim 3, wherein the said cylinder comprises a frame embracing a member adapted to be fastened to the apparatus body, the said second coupling member arm being pivotally connected to the frame, and the piston being interposed between the cylinder and the frame-embraced member so as to enter the cylinder for power absorption upon operation of the safety device.

6. A safety device as claimed in claim 5, wherein the frame-embraced member comprises a positive stop member providing a positive stop for operation of the safety device upon maximum power absorption by the power absorbing member.

7. A safety device as claimed in claim 1, wherein the said first coupling member is a disc having a radially-extending hook portion, and the said second coupling member includes a pair of spaced arms embracing the said disc and having a bridging member connecting the arms for engagement with the said hook portion, the said spaced arms being pivoted to the power-absorbing member.

8. A safety device as claimed in claim 7, wherein said arms are of L-shape, with respective legs thereof extending radially of the disc to maintain the arms in said embracing engagement with the disc during their movement between coupled and uncoupled positions.

9. A safety device as claimed in claim 3, and including a liquid reservoir, means for pressurising the reservoir interior for supply of the liquid thereto, and pipe means connecting the relief valve and the reservoir interior upon operation of the safety device.

10. A safety device as claimed in claim 2, wherein means for moving the said arm between coupling and uncoupling positions include a pneumatic motor adapted to be connected between the arm and the apparatus body and operable upon operation of the apparatus to move the arm to the said uncoupling position for a predetermined period.

11. A safety device as claimed in claim 1, wherein the mechanically-operated apparatus is driven by an electric motor, and including an electric switch adapted for engagement by the said second coupling member upon operation of the safety device and operable upon such engagement to stop the supply of power to the said electric motor.

12. A safety device as claimed in claim 1, and including an electric switch adapted for engagement by the said second coupling member in the said uncoupling position and operable upon such engagement to permit actuation of the clutch.

13. A safety device as claimed in claim 10, wherein means for initiating an actuation of the clutch includes a solenoid-operated clutch valve and means for operating the said pneumatic motor comprise a solenoid-operated air valve supplying operating air to the motor, an electric time delay relay connected to supply electric current to the solenoid-operated air valve, an operator-controlled electric switch connected to the solenoid-operated clutch valve and to the time delay relay to initiate operation thereof, and another electric switch electrically connected with the operator-controlled electric switch and operated by the said coupling member upon its movement to the uncoupled position to change from a first condition to a second condition, said another electric switch in the first condition permitting the operation of the operator-controlled electric switch to initiate a consequent operation of the electric time delay relay but not to initiate an actuation of the clutch by operation of the solenoid-operated clutch valve, said consequent operation of the time delay relay causing operation of the solenoid-operated air valve to operate the pneumatic motor to move the coupling member to uncoupled position and thereby the said another electric switch to the said second condition in which the operator-controlled electric switch can initiate an actuation of the clutch by operation of the solenoid-operated clutch valve, the time delay relay after a predetermined time delay operating the solenoid-operated air valve to operate the pneumatic motor to move the coupled member back to the coupled position and thereby the said another electric switch back to the first condition.

14. A safety device as claimed in claim 1, wherein the first coupling member is a radially-extending hook member adapted to be mounted on a shaft for rotation therewith and said third coupling member is a radially-extending, radially-movable latch member adapted to be mounted on the same shaft and facing in the opposite direction to the hook member.

15. A safety device as claimed in claim 14, wherein the said third coupling latch member is spring-urged for radial movement into engagement with the second coupling member upon reverse movement of the operating member, the spring permitting movement of the third coupling member out of the path of the second coupling member upon forward movement of the operating member.

16. A safety device for use in combination with mechanically-operated apparatus such as a punch press or the like, the apparatus comprising:
 (a) a body;
 (b) an operating member movably mounted on the body to perform a work operation;
 (c) a power-driven rotatable flywheel mounted by the body and for driving the movable member in such a work operation;
 (d) a clutch connecting the flywheel and the movable member for the flywheel to drive the movable member upon actuation of the clutch; and
 (e) means for initiating such an actuation of the clutch the safety device comprising:
 (f) a first coupling member adapted for connection with the flywheel to be movable therewith;

(g) a second coupling member normally positionable in a coupling position for coupling engagement with the said first coupling member;

(h) means for moving one of the coupling members to an uncoupling position upon said initiation of clutch actuation, the thus-moved coupling member returning to the said coupling position before completion of a work operation by the movable member;

(i) a power-absorbing member for connection to the second coupling member and adapted to brake the movement of the operating member upon failure of the coupling members to uncouple;

(j) the said power-absorbing member comprising a hydraulic piston and cylinder, and a relief valve connected to the cylinder interior and adapted to relieve the liquid contents of the cylinder upon operation of the device; and (k) a frame embracing a member adapted to be fastened to the apparatus body, the said second coupling member arm being connected to the frame, and the piston being interposed between the cylinder and the frame-embraced member so as to enter the cylinder for power absorption upon operation of the safety device.

17. A safety device as claimed in claim 16, wherein the frame-embraced member comprises a positive stop member providing a positive stop for operation of the safety device upon maximum power absorption by the power absorbing member.

18. A safety device as claimed in claim 16, wherein the said first coupling member is a radially-extending hook member adapted to be mounted on a shaft for rotation therewith, and said second coupling member includes an arm pivoted to the said power-absorbing member for movement between the said coupled and uncoupled positions.

19. A safety device as claimed in claim 16, wherein the said hydraulic piston and cylinder are engaged with a stop member adapted to be fastened to the apparatus body, the hydraulic piston and cylinder being connected between the arm and the stop member, and the stop member providing a positive stop for operation of the safety device upon maximum power absorption by the power-absorbing member.

20. A safety device as claimed in claim 16, wherein the said first coupling member is a disc having a radially-extending hook portion, and the said second coupling member includes a pair of spaced arms embracing the said disc and having a bridging member connecting the arms for engagement with the said hook portion, the said spaced arms being pivoted to the power-absorbing member.

21. A safety device as claimed in claim 20, wherein said arms are of L-shape, with respective legs thereof extending radially of the disc to maintain the arms in said embracing engagement with the disc during their movement between coupled and uncoupled positions.

* * * * *